United States Patent Office 3,107,476
Patented Oct. 22, 1963

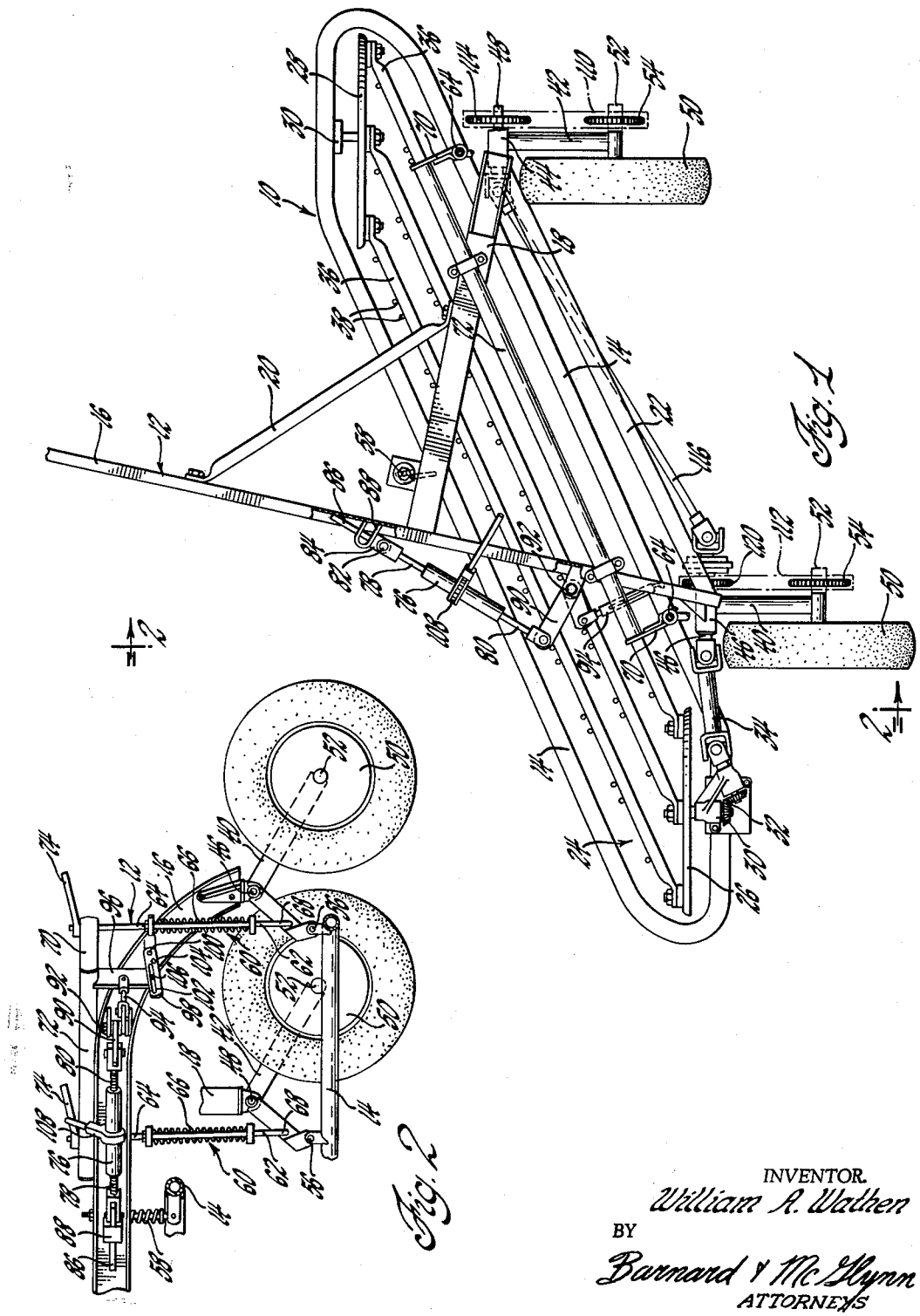

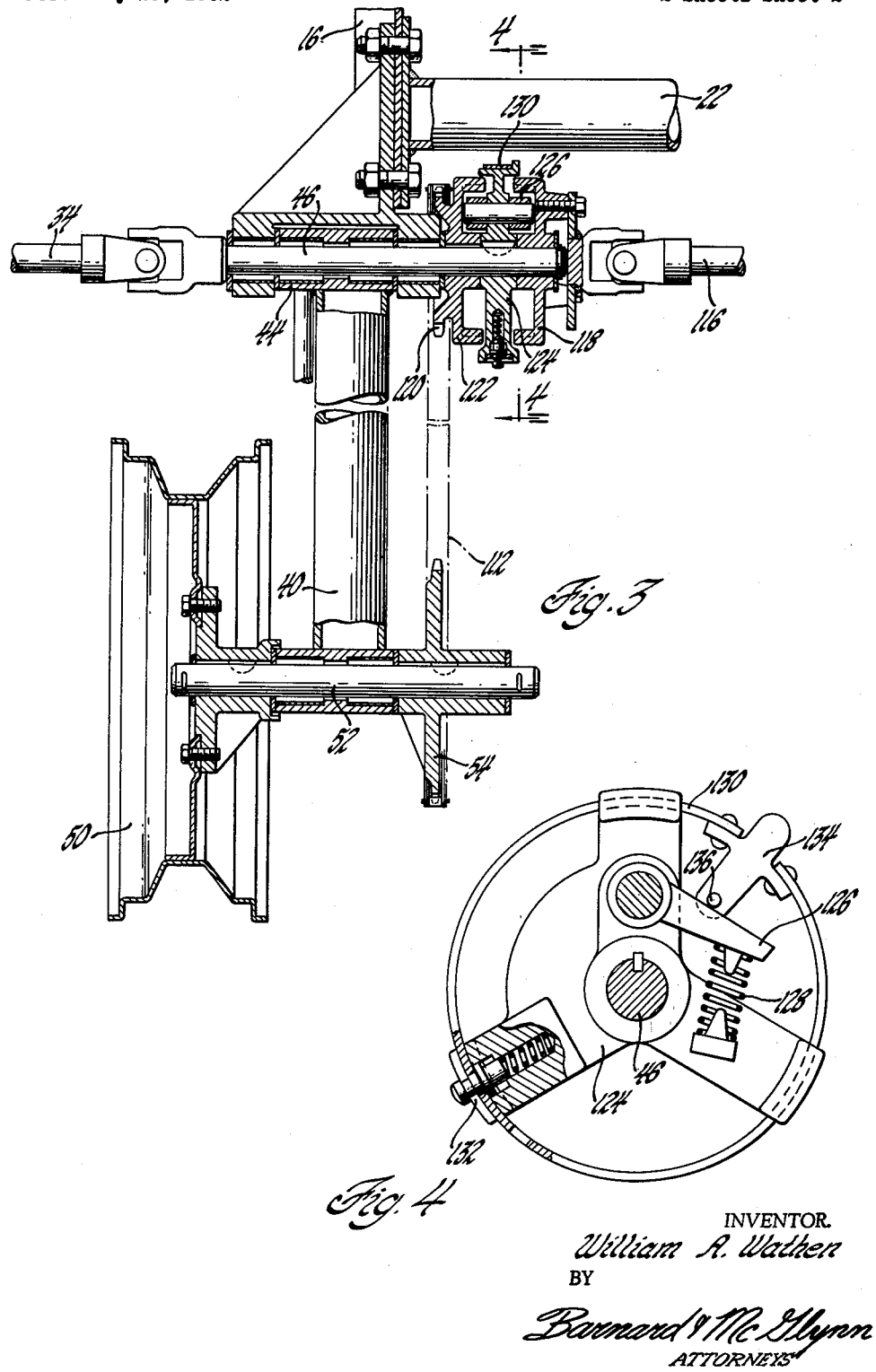

3,107,476
SIDE DELIVERY RAKE
William A. Wathen, Detroit, Mich., assignor to Massey-Ferguson, Inc., Detroit, Mich., a corporation of Maryland
Filed May 25, 1962, Ser. No. 197,635
8 Claims. (Cl. 56—377)

This invention relates to an implement such as a side delivery rake or the like of the type comprising a wheeled transportable main frame and an implement-supporting subframe adjustably suspended thereon for movement between a lowered working condition and a raised transport position and, in particular, is directed to a side delivery rake characterized by an improved adjustable suspension mechanism for the reel cage of the rake and the wheeled main frame thereof.

Side delivery rakes typically comprise a wheeled transportable main frame adapted to be hitched to a suitable prime mover, such as an agricultural tractor, and a subframe or reel cage for the rake vertically adjustably mounted on the main frame for raising and lowering movement between a lowered raking position and a raised road or field transport position. Heretofore, various manually and power operated mechanisms have been employed for controlling the vertical adjustment of the reel cage of the rake relative to its main frame and the ground. In some instances, such mechanisms have comprised lever systems carried on the main frame and connected through suspension rods to provide an adjustable support for the reel cage relative to the main frame and the ground. In other instances, it has also been suggested to provide independent adjustable support means for the main frame to permit raising and lowering of the latter relative to the ground, thereby providing greater flexibility in the vertical adjustment of the reel cage relative to the ground as requirements dictate.

However, in the prior rake constructions aforementioned, the manually or power operated mechanisms utilized have been required to provide a considerable degree of "throw" or operating travel to insure obtaining the range of vertical adjustment required for the reel cage as the situation warrants. While this problem is mitigated to some extent in those rakes in which the main frame is also adjustable independently of the reel cage it will, of course, be obvious that two distinct adjustments are required for the main frame and the reel cage in elevating the latter between an extreme lowered raking position and an extreme raised transport position. Furthermore, in implements of this type, it is highly desirable that the adjusting mechanism for the reel cage be alternately interchangeable between mechanically and hydraulically actuated power devices since many tractors are not equipped with a suitable hydraulic system to accommodate hydraulically actuated power devices. In prior implements of this type, however, such interchangeability has not been too feasible.

According to the present invention, an improved suspension mechanism is provided for an agricultural implement such as a side delivery rake or the like having a transportable main frame and an implement-supporting subframe or reel cage carried thereby, and which suspension mechanism is particularly characterized by suspension arm means pivotally mounted for oscillation on the main frame, ground engaging wheel means rotatably supported on the suspension arm means for transporting the main frame, means pivotally connecting the suspension arm means to the subframe or reel cage, and control means operatively connected between the main frame of the vehicle and the suspension arm means to control oscillatory movement of the latter and concurrent raising and lowering movement of the main frame and subframe or reel cage relative to each other and the ground between a lowered working or raking position and a raised transport position.

The invention is further characterized by the fact that the aforementioned control means includes control rod means connected to the suspension arm means in spaced relation to the pivotal connection of the latter to the main frame and subframe or reel cage and to the axis of rotation of the wheel means so that operation of the control means in raising and lowering the subframe or reel cage between a lowered working or raking position and a raised transport position will cause the subframe or reel cage to move at a relatively greater rate and a relatively greater distance than similar movement of the main frame, thereby minimizing the "throw" or length of travel required for control means, be it manually, mechanically or hydraulically actuated.

The invention also contemplates utilizing an extensible and retractable jack of the mechanically or hydraulically actuated type for operating the aforementioned control means, and is further characterized by a mounting means for one end of such a jack readily adjustably and removably supportable on the main frame of the rake or the like to facilitate installation of a jack and interchange of different types thereof.

Another aspect of the invention is directed to a latch means having one position thereof limiting the extent to which the main frame and subframe or reel cage may be raised and lowered, and another locking position positively holding the aforementioned frames in their respective transport positions relative to each other and the ground, thereby removing loads from jacks of the types aforementioned and further facilitating replacement or interchange thereof.

The invention is further directed in another of its aspects to a drive means connecting the wheel means of the main frame to a raking mechanism carried by a reel cage, and particularly characterized by a single manually adjustable unidirectional clutch means which may be readily adjusted to selectively drivingly couple and uncouple the wheel means and the rake driving mechanism.

In order to facilitate an understanding of the invention, a preferred embodiment thereof will now be described with reference to the accompanying drawings in which:

FIGURE 1 is a top plan view of a side delivery rake illustrating a preferred embodiment of the present invention;

FIGURE 2 is a fragmentary sectional view taken on line 2—2 of FIGURE 1;

FIGURE 3 is an enlarged vertical sectional view of the left wheel of the rake shown in FIGURE 1 and illustrates certain details of the rake driving mechanism; and FIGURE 4 is an enlarged fragmentary sectional view taken on line 4—4 of FIGURE 3.

Referring now to the drawings, there is illustrated a side delivery rake 10 comprising a main frame 12 and the usual subframe or reel cage 14. The main frame 12 comprises an arched leg member 16 having one end thereof provided with a suitable hitch mechanism adapted to be coupled in the usual manner to the drawbar of a suitable prime mover, such as an agricultural tractor for towing the frame along a field to be raked, and another arched leg member 18 having one end thereof rigidly secured to the leg member 16 intermediate the ends of the latter and extending substantially at right angles thereto. A bracing member 20 is provided between a forward portion of the leg member 16 and the leg member 18 and another bracing member 22 connects the extreme arched ends of the leg members to rigidify the main frame structure.

The usual raking reel 24 comprises a pair of spiders 26 and 28 which are respectively suitably rotatably supported at opposite ends of reel cage 14 as indicated at 30.

The one spider 26 is rotatably driven through the usual final drive bevel gearing 32 mounted on one end of the reel cage and coupled through the shaft 34 to the wheels of the main frame as will appear hereinafter. A plurality of rake bars 36 extend between and are connected in the usual manner to the respective spiders 26 and 28, and each is adapted to mount rake tines 38 thereon. The usual stripper bars extending between the front and rear portions of the reel cage 14 will be provided, but are not shown for the sake of clarity in the drawings.

A pair of suspension arms 40 and 42 of substantially bell crank configuration each include a hub portion 44 intermediate the ends thereof suitably pivotally supported about rotatable shafts 46 and 48, respectively, journaled at the lower ends of the respective leg portions 16 and 18 of the main frame, the shaft 46 being suitably coupled to the aforementioned shaft 34 to drive the latter. A pair of wheels 50 are respectively secured for rotation with shafts 52 rotatably supported at one end of each of the suspension arms, a sprocket 54 being secured to each of the wheel shafts 52. The other ends of the respective suspension arms 40 and 42 are pivotally connected at 56 to spaced points on the rearward portion of the reel cage 14. A conventional spring cushioned vertically adjustable support rod mechanism 58 is pivotally connected between the leg portion 18 of the main frame and the forward portion of the reel cage 14 to adjustably support the latter. In similar fashion, a pair of vertically adjustable control rods 60 each include relatively reciprocable elements 62 and 64 confining a compression spring 66 therebetween, with the elements 62 suitably pivotally secured at 68 to the respective suspension arms 40 and 42 and the other elements 64 thereof connected to arms 70 rigidly secured to an elongate torque tube or control shaft 72 suitably rotatably mounted on and extending between the leg portions 16 and 18 of the main frame. Adjustable nuts engageable with cooperating tools 74 are provided at the upper ends of each of the control rods 60 to adjust the lengths of the latter.

At this juncture, it is to be noted that the relative spacing along each of the suspension arms 40 and 42 between the axis of rotation of each of the wheel shafts 52, suspension arm pivot shafts 46 and 48, pivot connections 56 to the reel cage and the pivot connections 68 of the control rods to the respective suspension arms is such that oscillation of the suspension arms about shafts 46 and 48 through any given arcuate increment in either direction results in the reel cage 14 moving at a greater rate and a greater distance than the main frame 12 relative to the latter and the ground. In other words, the geometry of the aforementioned connections is such that upon lifting or lowering the control rods 60, the reel cage 14 is lifted or lowered at a greater rate and a greater distance relative to the ground than movement of the main frame 12.

Lifting and lowering movement of the control rods 60 and, hence, that of the main frame and reel cage is controlled by a mechanical jack including a cylinder member 76 and a pair of screw members 78 and 80 of opposite hand threads threadably engaged therein. The screw member 78 is pivotally connected at 82 to the head 84 of an elongated tongue 86 slidably disposed within a support bracket 88 secured to the main frame. The other screw member 80 is pivotally connected to one arm of a bell crank lever 90 pivoted at 92 to the main frame, the other arm thereof being pivotally connected through the link 94 to a lever arm 96 secured to one end of the torque tube or control shaft 72. A motion limiting and stop arm 98 has one end thereof suitably pivotally connected at 100 to a portion of the main frame, and includes an elongated slot 102 and a locking aperture 104. A pin 106 is removably insertable in the end of the lever arm 96 and may be disposed within the slot 102 to limit rotation of the torque tube or control shaft by the mechanical jack during use of the rake in a field and raising and lowering thereof. When it is desired to lift the reel cage from a raking position to a transport position and lock it positively in such position, the pin 106 may be removed from the slot 102 and the arm 98 pivoted to align the aperture 104 therein with the aperture in the lever arm 96 to receive the pin 106. As a result, the lever arm 96 and, hence, the torque tube or control shaft 72 are locked positively to the main frame of the vehicle preventing lowering movement of the reel cage and main frame toward the ground. A conventional manually operable ratchet mechanism indicated at 108 is provided for rotating the cylinder member 76 to extend or retract the screw members 78 and 80 and rotate the torque tube or control shaft in opposite directions to control raising and lowering movement of the main frame and reel cage.

Reel drive chains 110 and 112 are entrained about the respective sprockets 54 associated with each of the wheel shafts 52, the chain 110 being further entrained about a sprocket 114 secured to shaft 48 coupled through shaft 116 to a driving clutch member 118 rotatably supported about the aforedescribed shaft 46. In similar fashion, the drive chain 112 is entrained about sprocket 120 secured to another driving clutch member 122 also rotatably supported about the shaft 46. A driven clutch member 124 is secured to the shaft 46 between the clutch members 118 and 122, and is provided on opposite sides thereof with pivotally mounted clutch pawls 126 the free ends of which are continuously urged by springs 128 mounted on the driven clutch member to a position in which they will engage with the respective clutch faces of the clutch members 118 and 122. A band 130 is adjustably mounted about the periphery of the driven clutch member 124 and is adapted to be held in any selected position thereon by any suitable means such as the set mechanism indicated at 132. An arm 134 projects radially inwardly from the band 130 and includes a pair of oppositely projecting pins 136 cooperating with the respective pawls 126 to selectively dispose the latter in positions either engageable with the respective clutch members 118 or 122 or out of engagement therewith as they are rotated with the respective wheels 50.

As the wheels 50 rotate at substantially the same speeds, and with the band 130 adjusted for engagement of the pawls 126 with the clutch members 118 and 122, the driven clutch member 124 transmits drive through the shaft 46 and bevel gearing 32 to the spider 26 to drive the rake reel 24. Should one or the other of the wheels speed up relative to the other or even move backward such as in making a turn under some conditions, the faster or forwardly rotating clutch member will continue to provide drive to the rake reel while the other clutch member will ride over the pawl associated therewith as will be readily apparent. When it is desired to uncouple the rake wheel 24 from the wheel, as when preparing to transport the apparatus along a road, the band 130 is merely adjusted to depress the pawls 126 out of operative engagement with the clutch members 118 and 122 thereby disrupting drive from both wheels to the rake reel.

In operation, it may be assumed that the rake construction aforedescribed is driven into a field which it is desired to rake with the main frame 12 and reel cage 14 latched in their transport positions by the arm 98 as aforedescribed. At this time, the pin 106 is removed from the lever arm 96 and repositioned therein so as to ride within the elongated slot 102. The mechanical jack is then adjusted to retract same by means of the ratchet mechanism 108 permitting rotation of the torque tube or control shaft 72 and lowering movement of the control rods 60. As a result, the suspension arms 40 and 42 swing counterclockwise in FIGURE 2 lowering both the main frame 12 and the reel cage 14 but the latter at a much greater rate and a greater distance for any given arcuate degree of movement of the suspension arms as aforementioned. The vehicle is then disposed in its raking position and, upon engaging the clutch mechanism, the rake may be towed along a field and a raking operation conducted in the usual manner. When it is desired to move the reel cage and main frame to a transport position, the jack is operated in a reverse direction or extended by the ratchet construction, thereby lifting upwardly on the control rods 60 and pivoting the suspension arms in a reverse direction to raise both the main frame and the reel cage. The latch mechanism may then be placed in the transport position if desired and as aforedescribed.

At this juncture, it should be noted that the mechanical jack may be easily replaced by another mechanical jack or even an hydraulically operated piston and cylinder unit upon latching the torque tube or control shaft 72 in a transport position as aforementioned. Thus, it is only necessary to disengage the screw member 80 from bell crank lever 90 at which time the entire jack construction may be pulled with the tongue 86 from the support bracket 88 on the main frame. Another jack may then be hinged to the head 84 of tongue 86 and the latter re-inserted within the support bracket on the main frame. Due to the sliding fit of the tongue in the support bracket, the other end of the replacement jack may be easily aligned for connection with the bell crank lever 90 in the latched position thereof. Furthermore, upon installing a jack of a given length between the head member 84 and the bell crank lever 90, it will be readily apparent that the jack may then be extended until the head member engages the support bracket 88 to provide the necessary reaction required during further extension or retraction of the jack to raise and lower the main frame and reel cage.

The embodiments of the invention in which an exclusive property or privilege is claimed are defined as follows:

1. In an implement such as a side delivery rake or the like of the type having a transportable main frame and an implement-supporting subframe carried thereby; the improvement comprising suspension means concurrently vertically adjustably supporting said main frame and said subframe relative to each other and the ground, said suspension means comprising suspension arm means pivotally mounted on said main frame for oscillation thereon, ground-engaging whel means rotatably supported on said arm means for transporting said main frame, means pivotally connecting said arm means to said subframe, and control means operatively connecting said main frame to said arm means to control oscillatory movement of the latter on said main frame.

2. The implement according to claim 1 in which said control means is operatively connected to said arm means spaced from the pivotal connections of the latter to said main frame and subframe, and wherein the spacing between said connections and the axis of rotation of said wheel means on said arm means is such that oscillation of said arm means through a given arc to adjust said main frame and subframe relative to the ground causes said subframe to move at a greater rate and a greater distance than said main frame.

3. The implement according to claim 1 in which said control means comprises a control shaft rotatably supported on said main frame, control rod means operatively connecting said control shaft to said arm means, and operating means for rotating said control shaft to adjust said main frame and subframe relative to each other and the ground.

4. The implement according to claim 1 in which there are at least a pair of said suspension arm means and wheel means rotatably supported on each thereof, and in which said subframe comprises a reel cage for a side delivery rake, spaced spiders rotatably supported on said cage, rake bars extending between and mounted on said spiders, drive means including clutch means selectively operable to connect and disconnect drive from said wheel means to one of said spiders, said clutch means comprising a rotatable driven shaft drivingly connected to said one of said spiders, a driven clutch member secured on said driven shaft, a pair of driving clutch members respectively connected to said wheel means and rotatably mounted about said driven shaft on opposite sides of said driven clutch member, a pair of clutch pawls respectively pivotally mounted on opposite sides of said driven clutch member adjacent said respective driving clutch members, spring means biasing said pawls toward clutching engagement with said respective driving clutch members, and manually adjustable means mounted on said driven clutch member and engageable with said pawls to selectively control the position of the latter relative to said driving clutch members.

5. The implement according to claim 3 in which said control rod means includes relatively reciprocable elements respectively operatively connected to said control shaft and said arm means, and suspension spring means acting between said elements to form a resilient support between said arm means and said main frame.

6. The implement according to claim 3 in which said operating means comprises an extensible and retractable jack including relatively reciprocable members, a lever arm secured to said control shaft, means pivotally connecting one of said members to said lever arm, mounting means, means pivotally connecting the other of said members to said mounting means, and support means including a fixed stop removably slidably supporting said mounting means on said main frame, said mounting means being engageable with said fixed stop upon extension of said jack to a predetermined extent.

7. The implement according to claim 6 in which said mounting means comprises a head member and an elongated tongue secured thereto and projecting therefrom, and said support means comprises a bracket having an aperture therein and secured to said main frame, said tongue being slidably supported with said aperture and said head member being engageable with said bracket upon extension of said jack to a predetermined extent.

8. The implement according to claim 6 further comprising latch means for limiting rotation of said control shaft by said operating means and for positively latching said control shaft in position to hold said main frame and subframe in predetermined transport positions relative to each other and the ground, said latch means comprising a latch arm pivotally connected to said main frame and including an elongated slot and a locking aperture thereon, and follower pin means removably secured to said lever arm and removably disposable within said slot to limit rotation of said control shaft by said operating means, said follower pin means being removable from said slot and insertable through said aperture in said latch arm to hold said main frame and subframe in said transport position.

References Cited in the file of this patent

UNITED STATES PATENTS

| | | |
|---|---|---|
| 2,597,828 | Spurlin | May 20, 1952 |
| 2,781,626 | Happe et al. | Feb. 19, 1957 |